(12) United States Patent
Dutta et al.

(10) Patent No.: US 12,101,378 B2
(45) Date of Patent: Sep. 24, 2024

(54) STORAGE ARRAY FLEET MANAGEMENT

(71) Applicant: HEWLETT PACKARD ENTERPRISE DEVELOPMENT LP, Spring, TX (US)

(72) Inventors: Mayukh Dutta, Karnataka (IN); Manoj Srivatsav, Karnataka (IN); Aesha Dhar Roy, Karnataka (IN); Ashwin Jaydev Nair, Tempe, AZ (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/063,110

(22) Filed: Dec. 8, 2022

(65) Prior Publication Data
US 2024/0195870 A1    Jun. 13, 2024

(51) Int. Cl.
*H04L 67/1097* (2022.01)
*G06F 3/06* (2006.01)

(52) U.S. Cl.
CPC ........ *H04L 67/1097* (2013.01); *G06F 3/0617* (2013.01); *G06F 3/0626* (2013.01); *G06F 3/065* (2013.01); *G06F 3/0689* (2013.01)

(58) Field of Classification Search
CPC ....... G06F 3/0604–0607; G06F 3/0617; G06F 3/0626; G06F 3/0629–0637; G06F 3/065; G06F 3/0689; H04L 67/01; H04L 67/1097
See application file for complete search history.

(56) References Cited

U.S. PATENT DOCUMENTS

| | | | | |
|---|---|---|---|---|
| 8,868,870 | B1 * | 10/2014 | Vemuri | G06F 3/0635 709/217 |
| 8,972,694 | B1 | 3/2015 | Dolan et al. | |
| 9,933,967 | B1 * | 4/2018 | Ei-Ali | G06F 3/067 |
| 10,148,498 | B1 | 12/2018 | Gould et al. | |
| 10,868,736 | B2 | 12/2020 | Kottapalli et al. | |

(Continued)

FOREIGN PATENT DOCUMENTS

| CN | 113126922 A | 7/2021 |
|---|---|---|
| CN | 113504954 A | 10/2021 |

OTHER PUBLICATIONS

Dutla et al., U.S. Appl. No. 17/650,426 entitled Storage System Selection for Storage Volume Deployment filed Feb. 9, 2022, pp. 34.

(Continued)

*Primary Examiner* — Jonathan A Bui
(74) *Attorney, Agent, or Firm* — Trop, Pruner & Hu, P.C.

(57) ABSTRACT

In some examples, a fleet storage provider performs storage management operations for a fleet of storage arrays, the storage arrays in the fleet of storage arrays being of one or more storage types. In response to an addition, to the fleet of storage arrays, of a new storage array of a first storage type different from each storage type of the one or more storage types, a system identifies the new storage array as being associated with a first storage class of a plurality of different storage classes, and associates the new storage array with a fleet service that abstracts component details of the fleet of storage arrays to the fleet storage provider. In response to a request, the system provisions a storage volume on a selected storage array of the fleet of storage arrays, the provisioning performed by the fleet storage provider in cooperation with the fleet service.

20 Claims, 6 Drawing Sheets

(56) References Cited

U.S. PATENT DOCUMENTS

| | | | | |
|---|---|---|---|---|
| 2009/0228748 | A1* | 9/2009 | Hagerott | G06F 11/2215 |
| | | | | 711/E12.001 |
| 2016/0352830 | A1* | 12/2016 | Borowiec | H04L 67/1097 |
| 2016/0352834 | A1* | 12/2016 | Borowiec | G06F 3/0634 |
| 2016/0378376 | A1* | 12/2016 | Gao | G06F 3/0689 |
| | | | | 711/114 |
| 2017/0109045 | A1* | 4/2017 | Crawford | G06F 3/067 |
| 2017/0315801 | A1* | 11/2017 | Fullbright | G06F 8/20 |
| 2018/0196947 | A1* | 7/2018 | Davis | G06F 21/602 |
| 2021/0240369 | A1* | 8/2021 | Cain | G06F 3/0679 |
| 2021/0360068 | A1* | 11/2021 | Borowiec | H04L 67/1097 |
| 2021/0373786 | A1* | 12/2021 | Glimcher | G06F 3/061 |
| 2022/0035574 | A1 | 2/2022 | Cain | |
| 2022/0052993 | A1* | 2/2022 | Zhuravlev | G06F 21/6218 |
| 2022/0291986 | A1* | 9/2022 | Klein | G06F 3/0653 |
| 2022/0365821 | A1* | 11/2022 | Darji | G06F 21/64 |

OTHER PUBLICATIONS

HPE CSI Driver for Kubernetes downloaded Nov. 5, 2022, pp. 3.
HPE Storage, Container Storage Provider (CSP) downloaded Nov. 5, 2022, pp. 2.
HPE Storage, Container Storage Provider (CSP) Spec downloaded Nov. 5, 2022, pp. 27.
SCOD Alletra 6000 and Nimble downloaded Nov. 5, 2022, pp. 9.
SCOD Alletra 9000 and Primera/3PAR downloaded Nov. 5, 2022, pp. 11.
SCOD CSI downloaded Nov. 5, 2022, pp. 8.
Wikipedia, Kubernetes last edited Nov. 2, 2022, pp. 18.
Amazon Web Services, Inc., "CreateVolume," Amazon Elastic Compute Cloud: API Reference, API Version Nov. 15, 2016, 2022, 9 pages.
Matthew Shiroma, "Leveraging AWS EBS for Kubernetes Persistent Volumes," Aug. 27, 2019, 12 pages.
Mirantis Inc., "Use AWS EBS Storage," Dec. 1, 2022, <https://web.archive.org/web/20221201025512/https://docs.mirantis.com/mke/3.6/ops/deploy-apps-k8s/persistent-storage/use-aws-ebs-storage.html>, 3 pages.
Mirantis Inc., "Use Azure Disk Storage," Dec. 1, 2022, <https://web.archive.org/web/20221201022534/https://docs.mirantis.com/mke/3.6/ops/deploy-apps-k8s/persistent-storage/use-azure-disk-storage.html>, 5 pages.

* cited by examiner

STORAGE ARRAY FLEET MANAGEMENT

BACKGROUND

An enterprise (e.g., a business organization, a government agency, an educational organization, an individual, or any other type of organization, or any combination of one or more of each of the foregoing) can employ storage arrays on which storage volumes can be deployed. The storage arrays may be used by users of the enterprise, whether internal users or external users. For example, the storage arrays may be part of a data center. Alternatively, the storage arrays may be accessible in a cloud.

BRIEF DESCRIPTION OF THE DRAWINGS

Some implementations of the present disclosure are described with respect to the following figures.

Figure 1:
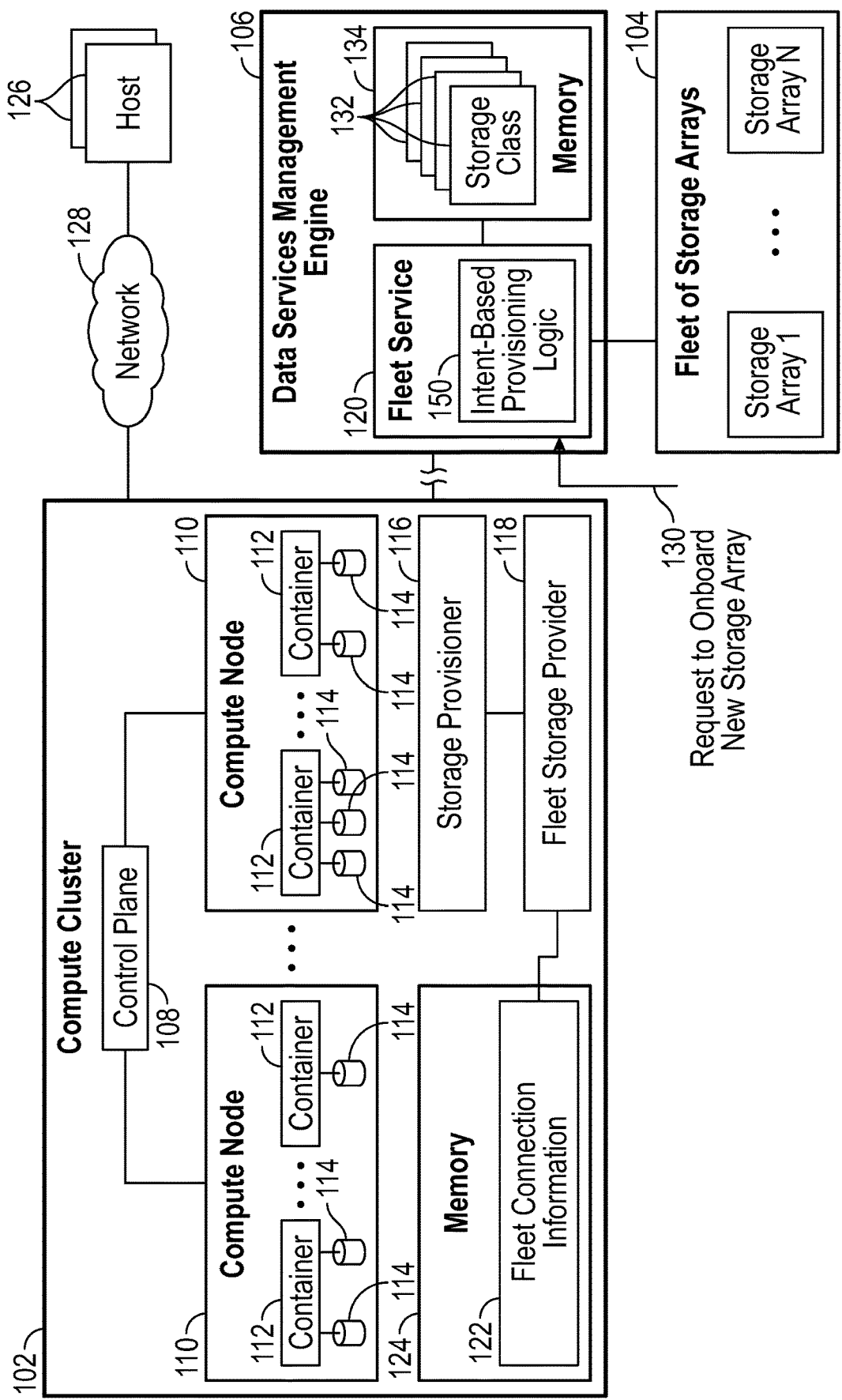
FIG. 1 is a block diagram of an arrangement that includes a compute cluster, a data services management engine, and a fleet of storage arrays, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Storage arrays can have different features. For example, storage arrays may include different types of storage devices, where some storage arrays can employ disk-based storage devices, while other storage arrays can employ solid-state drives or other types of storage devices. In further examples, storage arrays can employ different data reduction techniques, which can include any or some combination of data compression, data deduplication, and so forth. As further examples, storage arrays can implement different security features (e.g., data encryption, use of a security protocol, etc.). As other examples, storage arrays can have different storage capacities, with some storage arrays having larger storage capacities than other storage arrays. A storage capacity of a storage array refers to an amount of data that the storage array can store. In yet further examples, storage arrays can execute different operating systems or other programs (such as firmware, application programs, utility programs, etc.).

Storage arrays with different features such as those noted above are of different storage types. In other words, a first storage array of a first storage type has a first collection of features (a single feature or multiple features) that differs from a second collection of features (a single feature or multiple features) of a second storage array of a second storage type different from the first storage type. The feature(s) in each collection of features can include any or some combination of the following: a type of storage device, data reduction technique(s) used or not used, security feature(s) used or not used, a storage capacity, a type of OS executing in the storage array, and so forth.

A fleet of storage arrays can be used to store data that are accessible by users. A "fleet" of storage arrays can refer to any grouping of storage arrays, and can be operated by or on behalf of one or more enterprises. A "user" can refer to a human, a program, a machine, or any other entity that is able to access data in storage arrays.

In some examples, a compute cluster including compute nodes can be used to manage workloads associated with operations performed with respect to a fleet of storage arrays. The compute cluster can be a Kubernetes cluster, for example. Kubernetes is discussed further below.

To add a storage array to the fleet of storage arrays, a storage administrator (e.g., a human or another entity) can set up the storage array, which can include loading programs (e.g., an OS, an application program that controls data operations with respect to the storage array, etc.), and so forth. In addition, a compute node administrator (e.g., a human or another entity), who can be different from or the same as the storage administrator, can install, in the compute cluster, a storage provider (program) that performs data management operations for the storage array. Examples of data management operations can include provisioning, mounting, and deallocation of storage volumes, as well as other operations discussed further below.

Storage classes can be specified at the compute cluster for respective storage arrays of different storage types (as listed above). For each storage type, a corresponding storage class can be specified at the compute cluster. For example, a first storage class includes storage arrays that employ a specific type of storage devices, a second storage class includes storage arrays that employ data deduplication, a third storage class includes storage arrays that do not employ data deduplication, a fourth storage class is a mission-critical storage class that includes storage arrays with a 100% availability (or another availability) guarantee, and so forth.

In some examples, there is a one-to-one mapping between storage providers and storage arrays of different storage classes; in other words, for each storage array of a corresponding storage class, there is one corresponding storage provider and associated connection information (sometimes referred to as a "secret") installed at the compute cluster to allow the compute cluster to perform storage management operations with respect to the storage array. The connection information can include a network address (e.g., an Internet Protocol (IP) address) of the storage array, credentials (e.g., a username and password) to allow access of the storage array, and so forth. In such examples, there may be as many storage providers and associated connection information as there are storage arrays of different storage classes in the fleet of storage arrays.

Adding storage arrays to the fleet of storage arrays can become unwieldy and time consuming, since for each new storage array added (such as by the storage administrator), a new storage provider and associated connection information may have to be installed in the compute cluster (such as by the compute cluster administrator).

Additionally, after new storage arrays have been set up and corresponding storage providers have been installed in the compute cluster, a program administrator (who may be the same as or different from each of the storage administrator and/or compute cluster administrator) can install a program (e.g., an application program) to consume data stored in one or more storage arrays. When installing the program, the program administrator may have to decide which storage arrays the storage volume is to be provisioned on, which may be difficult if the program administrator is unaware of specific storage classes associated with storage arrays in the fleet of storage arrays. To understand which storage arrays to use, the program administrator may have to consult with the compute cluster administrator and/or the storage administrator, which can involve a relatively large amount of manual work and back-and-forth communications between the administrators.

Moreover, once a storage volume is provisioned on a specific collection of storage arrays, any programs that consume data of the storage volume would access the specific collection of storage arrays (and not other storage arrays). Even if the compute cluster were to increase in computation capacity by adding additional compute nodes so that programs that access the storage volume can execute on a larger quantity of compute nodes, the specific collection of storage arrays may not scale up correspondingly. In other words, even though the computational capacity of the compute cluster has increased, the storage capacity may remain fixed, i.e., the storage capacity does not scale with the increase in computational capacity of the compute cluster. As a result, the specific collection of storage arrays may become a bottleneck during execution of workloads that access data of the storage volume.

In accordance with some implementations of the present disclosure, instead of using individual storage providers for respective storage arrays of different storage classes, a fleet-aware storage provider (or more simply, a "fleet storage provider") is used to perform storage management operations for the fleet of storage arrays that includes storage arrays of different storage classes. Use of the fleet storage provider for storage arrays of different storage classes is possible due to the presence of a fleet service that abstracts component details of the fleet of storage arrays. The fleet service "abstracts" the component details of the fleet of storage arrays by presenting an interface that is accessible by another entity, such as the fleet storage provider, to perform operations with respect to the fleet of storage arrays.

The fleet storage provider is able to issue requests to perform storage management operations to the fleet service without having to include in the requests component details of the storage arrays. For example, the fleet storage provider can issue a request to provision a storage volume on a storage array, without having to specify a network address or other details of the storage array. In some cases, the fleet storage provider does not even have to specify which storage array to provision the storage volume on. In response to the request from the fleet storage provider, the fleet service can select a storage array and provision the storage volume on the selected storage array. The fleet service is configured with the ability to communicate with storage arrays of different storage classes; for example, the fleet service is configured with information pertaining to how to connect to the storage arrays, where the configured information can include network addresses of the storage arrays, a security certificate (e.g., a Secure Sockets Layer (SSL) certificate or another digital certificate) used to enable communication over a secure link (e.g., a secure tunnel) between the fleet service and a storage array, and so forth.

In some examples, storage management operations that can be performed by the fleet storage provider with respect to a fleet of storage arrays can include any or some combination of the following. In other examples, alternative or additional storage management operations can be performed by the fleet storage provider. The storage management operations of the fleet storage provider can include management of the creation, update, and deletion of storage volumes. As examples, a host can issue a request to create, update, or delete a storage volume, where the request contains information of characteristics relating to the storage volume. In response to a request to create the storage volume, the fleet storage provider can provision the storage volume on a storage array (or multiple storage arrays) of the fleet of storage arrays in response to the request.

Other storage management operations of the fleet storage provider can include cloning storage volumes, taking snapshots of data of storage volumes, deleting snapshots, and so forth.

When onboarding a new storage array of a respective storage class (which can be the same as or different from any of the storage classes of the storage arrays in the fleet of storage arrays), the new storage array is associated with the fleet service so that the fleet service can be used to request operations with respect to the new storage array. In accordance with some examples of the present disclosure, an individual storage provider does not have to be installed for the new storage array, even if the new storage array is of a storage class different from each of the storage classes of the storage arrays presently in the fleet of storage arrays.

A "storage array" can refer to a physical arrangement of resources (including storage resources, processing resources, and communication resources) for storing data and managing requests to access (read or write) data and perform management operations with respect to the storage array. The storage resources of the storage array can include storage device(s), which can include a disk-based storage device, a solid-state drive, and so forth. The storage resources of the storage array may further include memory device(s), which can include a dynamic random access memory (DRAM) device, a static random access memory (SRAM) device, a flash memory device, and so forth. The processing resources of the storage array can include a processor (or multiple processors) on which machine-readable instructions are executable, such as an OS, an application program, and so forth. The communication resources of the storage array can include a network interface controller to allow the storage array to communicate over a network with another entity.

In some examples, logical partitions of storage of data, referred to as storage volumes, can also be defined. A storage volume can refer to a logical unit of storage of data in storage arrays. A storage volume can have a specified storage capacity, and requesters can access data in the storage volume. In some cases, multiple storage volumes can be defined that contain data stored in one storage array, and in further cases, the data of a storage volume can be spread across multiple storage arrays.

An entity (such as a user, a program, or a machine) can request that a storage volume (or multiple storage volumes) be provisioned in a fleet of storage arrays. "Provisioning" a storage volume in a fleet of storage arrays can refer to creating the storage volume and configuring the storage volume such that the storage volume is ready to store data and to receive requests to access data. A storage volume can be provisioned on one or more storage arrays, which means that data of the storage volume is physically stored in the one or more storage arrays.

FIG. 1 is a block diagram of an example arrangement that includes a compute cluster 102, a fleet of storage arrays 104, and a data services management engine 106. As used here, an "engine" can refer to one or more hardware processing resources, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing resources and machine-readable instructions (software and/or firmware) executable on the one or more hardware processing resources.

In some examples, the data services management engine 106 may be implemented with processing resources that are separate from the processing resources of the compute cluster 102. For example, the data services management engine 106 may be part of a cloud, part of a web server, part of a data center, and so forth. In other examples, the data services management engine 106 may be implemented with processing resources that are part of the compute cluster 102.

The compute cluster 102 includes a control plane 108 and a number (1 or greater than 1) of compute nodes 110 that are worker nodes of the compute cluster 102. The control plane 108 includes control services (implemented with machine-readable instructions) that perform control tasks to manage the compute cluster 102, including deploying programs on the compute nodes, removing programs from the compute nodes, managing storage volumes, and so forth. The control services of the control plane 108 can be executed on one or more computers (which can be the same as or different from the compute nodes 110) in the compute cluster 102.

A "compute node" can refer to a virtual machine (VM) or a physical computer. A "worker node" is a node with processing resources that is able to perform computational workloads, such as based on execution of a program that includes machine-readable instructions on the compute node.

In some examples, the compute cluster 102 is a Kubernetes cluster. In Kubernetes, compute nodes within a compute cluster pool together their resources (processing and storage resources) to distribute workloads across the compute nodes. In some examples, the control plane 108 can present an interface, such as an application programming interface (API) or another type of interface, that can be used by other entities to interact with the compute cluster 102. For example, the other entities can send commands to the compute cluster 102 through the interface. The commands can be used to deploy programs in the compute cluster 102, view and manage resources of the compute cluster 102, and so forth.

In some examples, each compute node 110 includes a collection of containers 112. A "container" refers to an isolated virtual environment in which a program is executable. If the compute cluster 102 is a Kubernetes cluster, then the containers 112 are included in pods, where a pod can include one container or multiple containers. In other examples, a "container" can also refer to a VM or any other type of virtual computing environment.

The compute cluster 102 further includes a storage provisioner 116 and a fleet storage provider 118, according to some examples. The storage provisioner 116 is the component that faces the hosts 126 and interacts with the containers 112 of the compute nodes 110, while the fleet storage provider 118 is the component that faces the fleet of storage arrays 104. Although FIG. 1 shows the storage provisioner 116 and the fleet storage provider 118 as being separate components, in other examples, the storage provisioner 116 and the fleet storage provider 118 are part of the same component. In examples where the storage provisioner 116 and the fleet storage provider 118 are separate components, the storage provisioner 116 can launch the fleet storage provider 118 for use in performing storage management operations with respect to the fleet of storage arrays 104.

In some examples, the storage provisioner 116 and/or the fleet storage provider 118 can be executed on one or more compute nodes 110. Note that multiple instances of the storage provisioner 116 and/or the fleet storage provider 118 can be executed in respective compute nodes 110 of the compute cluster 102. In other examples, the storage provisioner 116 and/or the fleet storage provider 118 can be executed on computers of the compute cluster 102 that are separate from the compute nodes 110.

The storage provisioner 116 provides an interface in the compute cluster 102 to receive requests pertaining to storage volumes from clients, such as hosts 126 and/or the control plane 108. The hosts 126 and/or the control plane 108 are able to issue, to the storage provisioner 116, requests for performing storage management operations with respect to the fleet of storage arrays 104. A "host" can refer to a user, a program, or a machine that is able to issue requests to the compute cluster 102. The hosts 126 are able to communicate with the compute cluster 102 over a network 128, such as a local area network (LAN), a wide area network (WAN), a public network, and so forth.

In some examples, the hosts 126 and/or the control plane 108 can issue requests to create, update, and/or delete storage volumes 114 for use by programs running in the containers 112. As noted above, a storage volume is a logical unit of data storage. In examples where the compute cluster 102 is a Kubernetes cluster, the storage volumes 114 are referred to as persistent volumes (PVs). To create a storage volume such as a PV, an entity (e.g., a host 126 or the control plane 108) can submit a request for creating a storage volume. In examples where the compute cluster 102 is a Kubernetes cluster, the request can include a persistent volume claim (PVC). In other examples, the hosts 126 and/or the control plane 108 can issue, to the storage provisioner 116, requests to perform other storage management operations.

In an example, in response to a request for a storage management operation, such as to create a storage volume, the storage provisioner 116 can perform host-related operations, such as mounting a storage volume 114 to a container 112 (or in an example where the compute cluster 102 is a Kubernetes cluster, mounting a persistent volume to a pod). Mounting a storage volume to a container or pod can refer to making available the storage volume for use by programs running in the containers 112 of the compute nodes 110.

In addition, in response a request for a storage management operation, the storage provisioner 116 can interact with the fleet storage provider 118 to perform the requested storage management operation. To perform a storage management operation, the fleet storage provider 118 does not interact directly with the fleet of storage arrays 104. Rather, the fleet storage provider 118 interacts with a fleet service 120 that is part of the data services management engine 106. The fleet service 120 abstracts component details of the storage arrays of the fleet of storage arrays 104 from the compute cluster 102, so that the fleet storage provider 118 would not have to be provided with individual connection information relating to the storage arrays. For example, the fleet storage provider 118 would not have to be provided with network addresses (e.g., IP addresses) of the storage arrays or security certificates of the storage arrays, since the fleet storage provider 118 accesses the storage arrays by issuing requests to the fleet service 120 that is configured with the foregoing component details of the storage arrays.

Instead of being provided with individual connection information relating to the storage arrays, the fleet storage provider 118 is provided fleet connection information 122 that allows the fleet storage provider 118 to communicate with the fleet service 120.

In some examples, the fleet connection information 122 can be stored in a memory 124, which includes a collection of memory devices (a single memory device or multiple memory devices). In examples where the fleet storage provider 118 is executed in a compute node 110 (or multiple instances of the fleet storage provider 118 are executed on respective compute nodes 110), the fleet connection information 122 can be stored in the memory of each respective compute node 110.

The fleet connection information 122 can include location information to allow the fleet storage provider 118 to access the fleet service 120. For example, the location information can include a uniform resource locator (URL) that relates to a location on a network at which the fleet service 120 is accessible. The URL may be associated with the data services management engine 106, or alternatively, the URL may be associated with the fleet service 120. In another example, the location information can include a network address, such as an IP address or a Medium Access Control (MAC) address. In other examples, other types of location information of the fleet service 120 can be included in the fleet connection information 122.

The fleet connection information 122 can also include credentials to authorize clients (e.g., hosts 126 and/or the control plane 108) that request storage management operations with respect to the fleet of storage arrays 104 through the fleet storage provider 118. The credentials can include a username and password, for example, which may be set up when a user registers with the compute cluster 102. In other examples, the credentials can include a certificate, a key, or any other secret information that is used by the fleet storage provider 118 to verify that a client is authorized to access the fleet service 120. For example, a request submitted by a client for creating, updating, or deleting a storage volume may include the credentials. The fleet storage provider 118 can authorize the request based on the credentials.

Due to the presence of the fleet service 120, individual storage providers to interact directly with storage arrays of the fleet of storage arrays 104 do not have to be installed in the compute cluster 102. Rather, a single fleet storage provider 118 (or multiple instances of the fleet storage provider 118) can be installed in the compute cluster 102 to perform storage operations with respect to the fleet of storage arrays 104 through the fleet service 120. Note that in examples with multiple instances of the fleet storage provider 118, the multiple instances of the fleet storage provider 118 are to distribute workload across the compute nodes 110 of the compute cluster 102. The multiple instances of the fleet storage provider 118 are unlike individual storage providers that are provided with individual connection information for different types of storage arrays.

Although FIG. 1 shows the fleet storage provider 118 as being present in the compute cluster 102, in other examples, the fleet storage provider 118 can be executed on a computer (or multiple computers) outside the compute cluster 102.

In accordance with some examples of the present disclosure, a user, such as a storage administrator, can onboard a new storage array for the fleet of storage arrays 104 by sending an onboarding request to the data services management engine 106. For example, the data services management engine 106 can present a portal (e.g., a web interface or other type of portal) through which a user can add information pertaining to a new storage array. A request to onboard a new storage array is represented as 130 in FIG. 1. The onboarding of the new storage array involves the user submitting information pertaining to the new storage array, including any or some combination of the following: adding information of the new storage array into an account associated with the user, adding an identifier (e.g., a serial number) of the new storage array, adding information of an owner of the new storage array, adding device information (e.g., a device configuration such as a storage capacity, a data reduction capability, a type of OS, a quantity of storage devices, etc.) of the new storage array, and so forth.

In accordance with some examples of the present disclosure, the onboarding of a new storage array does not involve the creation of an individual storage provider for the new storage array. Rather, the fleet storage provider, in cooperation with the fleet service 120, can perform storage management operations with respect to various storage arrays of different storage types in the fleet of storage arrays 104. As the new storage arrays are onboarded, the data services management engine 106 can create (automatically) storage classes for respective storage arrays of different storage types. In some examples, the user that onboards new storage arrays to the fleet of storage arrays 104 can provide a list of storage types of storage arrays that can be onboarded. The data services management engine 106 can automatically create storage classes corresponding to the different storage types (one storage class per storage type, for example) that are included in the list of storage types. In other examples, the data services management engine 106 can automatically create the storage classes based on storage capabilities of the storage arrays as they are onboarded. Information pertaining to the storage classes 132 can be stored in a memory 134 of the data services management engine 106.

Since the fleet service 120 abstracts details of the fleet of storage arrays 104, the fleet storage provider 118 and the storage provisioner 116 of the compute cluster 102 do not have to be provided with information pertaining to the details of the new storage array that has been onboarded. Rather, the fleet service 120 will be responsible for interacting with specific storage arrays of different storage types in response to storage management operations performed by the fleet storage provider 118.

Thus, once a new storage array is onboarded, no action has to be performed by the compute cluster administrator, since the compute cluster administrator would not have to install a new storage provider or install new connection information for the new storage array.

Note that even if a new storage array that is onboarded has a storage type that is different from the storage types of the existing storage arrays of the fleet of storage arrays 104, the compute cluster administrator would not have to install a new storage provider and new connection information, since the fleet storage provider 118 would use the fleet connection information 122 to interact with the fleet service 120 to perform operations with respect to the new storage array of the different storage type.

Figure 2A:
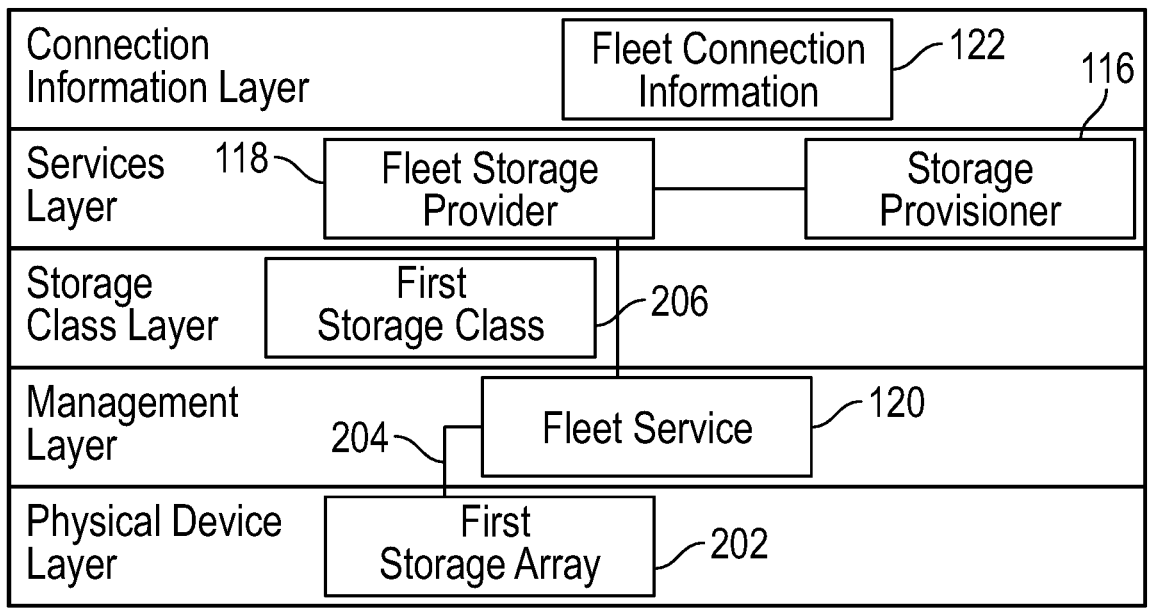
FIGS. 2A-2C illustrate management a fleet of storage arrays, according to some examples.
Figure 2B:
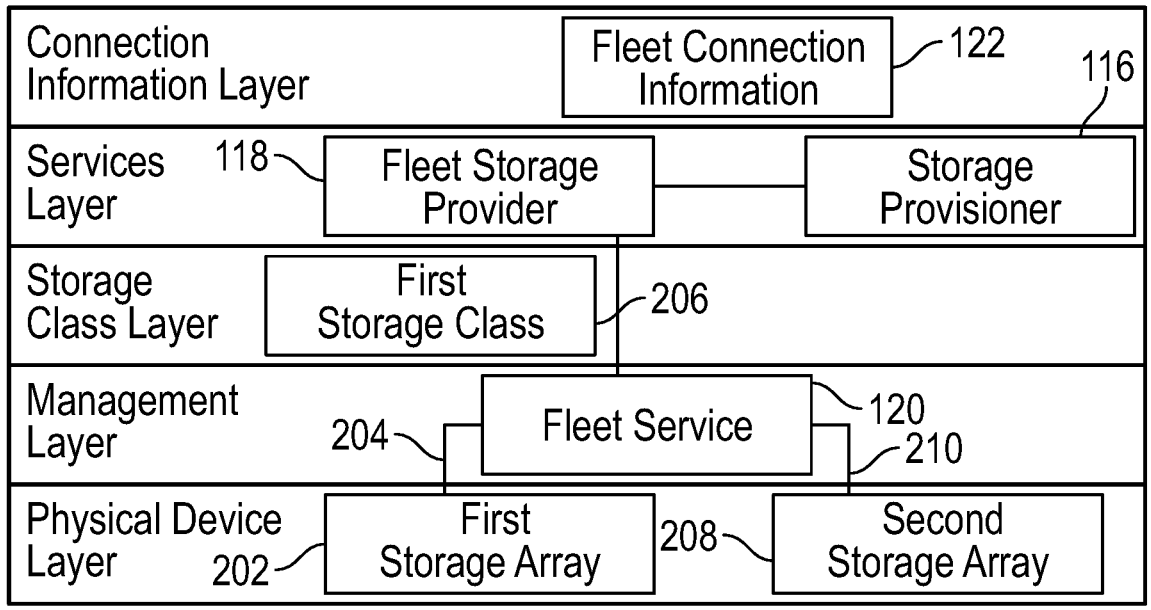
Figure 2C:
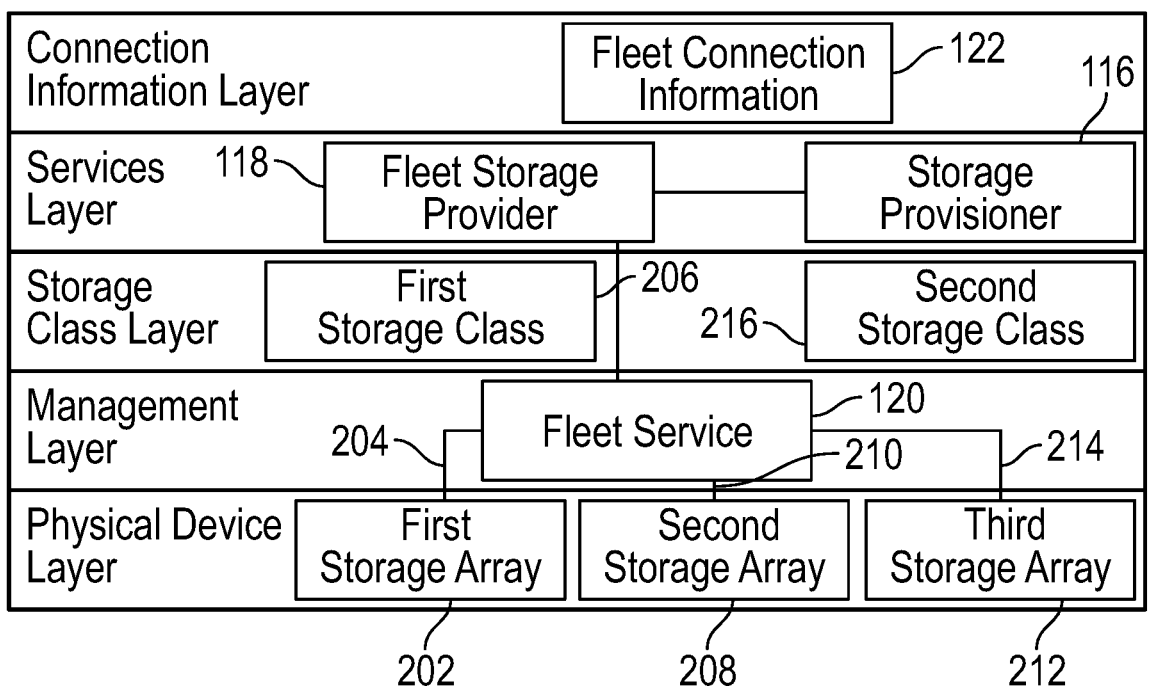

FIGS. 2A-2C illustrate examples for managing a fleet of storage arrays (e.g., 104 in FIG. 1), in accordance with some implementations of the present disclosure. Each of FIGS. 2A-2C depict various layers, including a physical device layer, a management layer, a services layer, a storage class layer, and a connection information layer. FIG. 2A depicts elements in the various layers associated with onboarding a first storage array of a first storage type (depicted as a first storage array 202 in FIG. 2A). The first storage array 202 (shown in the physical device layer) is associated (204) with the fleet service 120 (shown in the management layer). Associating the first storage array 202 with the fleet service 120 can include configuring the fleet service 120 with information (e.g., network address of first storage array 202, etc.) to allow the fleet service 120 to interact with the first storage array 202. As further shown in FIG. 2A, the services layer includes the storage provisioner 116 and the fleet storage provider 118. The connection information layer includes the fleet connection information 122 that allows the fleet storage provider 118 to access the fleet service 120 of the data services management engine 106.

FIG. 2A further shows that a first storage class 206 is added to the storage class layer, where the first storage class maps to the first storage type of the first storage array 202.

FIG. 2B depicts the onboarding of a second storage array (208) of the first storage type. The second storage array 208 (shown in the physical device layer) is associated (210) with the fleet service 120. Note that a new storage class does not have to be added to the storage class layer for the second storage array 208, since the first storage class mapped to the first storage type is already present in the storage class layer.

FIG. 2C depicts the onboarding of a third storage array (212) of a second storage type different from the first storage type. The third storage array 212 (shown in the physical device layer) is associated (214) with the fleet service 120. FIG. 2C further shows that a second storage class 216 is added to the storage class layer, where the second storage class maps to the second storage type of the third storage array 212. As shown in FIG. 2C, adding the third storage array 212 of the second storage type does not involve adding a new storage provider and new connection information for the third storage array 212. The fleet storage provider 118 and the fleet connection information 122 can be used to interact with the third storage array 212 through the fleet service 120.

Figure 3A:
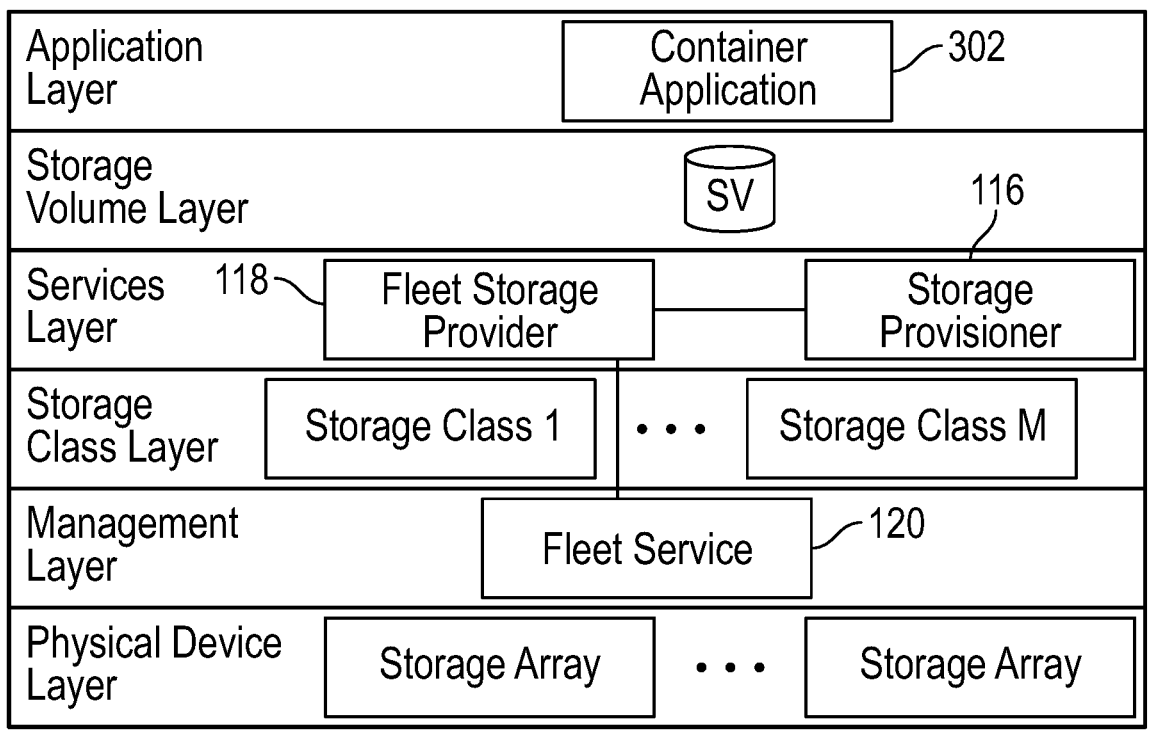
FIGS. 3A-3B illustrate consumption of a fleet of storage arrays, according to some examples.
Figure 3B:
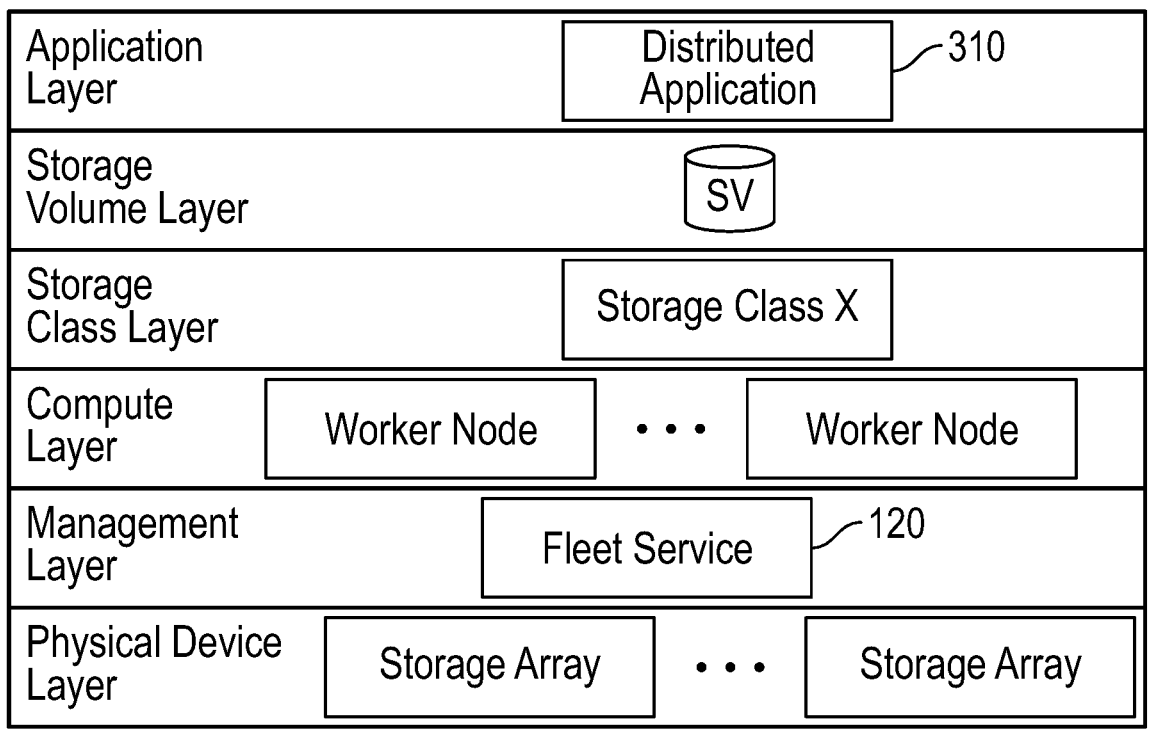

FIGS. 3A-3B illustrate examples of consuming a fleet of storage arrays. FIG. 3A shows an application layer, a storage volume layer, a services layer (including the storage provisioner 116 and the fleet storage provider 118), a storage class layer, a management layer (including the fleet service 120), and a physical device layer (including storage arrays).

A container application 302 is in the application layer. The container application 302 can be executed in a container 112 on a compute node 110 (FIG. 1). The container application 302 can be used to access data stored at the fleet of storage arrays. For example, the container application 302 can be a database application to access data stored in a database, or any other type of application program.

An entity (e.g., a user at a host 126 in FIG. 1) may submit a request to create a storage volume, which is received by the storage provisioner 116. The entity that submitted the request may be presented with the storage classes (e.g., 1 to M, M≥1) enumerated as storage arrays are onboarded. The storage classes may be based on storage types of the onboarded storage arrays. The enumeration of storage classes may be performed by the fleet storage provider 118 and/or the fleet service 120, for example. The entity submitted the request to create the storage volume can select (e.g., from a dropdown menu of a graphical user interface (GUI) listing the available storage classes) a storage class of a storage array to be associated with the storage volume.

In response to the request, the storage provisioner 116 mounts a storage volume SV to a container in which the container application 302 executes. The storage volume SV is in a storage volume layer in FIG. 3A. The fleet storage provider 118 in cooperation with the fleet service 120 provisions the storage volume SV on a storage array (or multiple storage arrays) of the selected storage class.

FIG. 3B shows an example of how a quantity of storage arrays of the fleet of storage arrays can be scaled with an increasing quantity of worker nodes (e.g., the compute nodes 110 of FIG. 1). FIG. 3B shows an application layer, a storage volume layer, a storage class layer (including storage class X that is selected when creating the storage volume SV), a management layer (including the fleet service 120), and a physical device layer (including storage arrays).

A distributed application 310 is in the application layer. Multiple instances of the distributed application 310 can execute on the worker nodes to perform distributed access of data of the storage volume SV. As the quantity of worker nodes increases (e.g., due to expansion of the compute cluster 102 by adding more compute nodes 110), the fleet service 120 can add additional storage arrays (mapped to the storage class X) onto which the storage volume SV can be provisioned. In this way, the multiple instances of the distributed application 310 running in corresponding containers of the worker nodes can access data of the storage volume SV in parallel from multiple storage arrays.

In accordance with some examples of the present disclosure, the fleet service 120 can perform intelligent selection of storage arrays onto which a storage volume is to be provisioned. For example, the fleet service 120 can include intent-based provisioning logic 150 (FIG. 1) to perform intent-based provisioning to select the storage array(s) from among a fleet of storage arrays onto which the storage volume is to be provisioned. Although FIG. 1 shows the intent-based provisioning logic 150 as being part of the fleet service 120, in other examples, the intent-based provisioning logic 150 can be separate from the fleet service 120. The intent-based provisioning logic 150 can be implemented with machine-readable instructions, for example.

The intent-based provisioning logic 150 receives input information associated with a request to create a storage volume, and based on the input information, selects one or more storage arrays onto which the storage volume is to be provisioned. The input information represents an "intent" of a workload associated with the storage volume to be provisioned. The intent-based provisioning logic 150 receives the "intent" (i.e., as represented by the input information), and infers a workload profile from the input information. The workload profile contains characteristics of the expected workload for the storage volume.

The intent-based provisioning logic 150 can simulate an execution of a workload having the workload profile in respective storage arrays of the fleet of storage arrays 104. Based on the simulations, respective headrooms used by the workload in each storage array are determined, and based on the determined headrooms, a storage array (or multiple storage arrays) can be selected for provisioning the storage volume.

A "headroom" of a storage array is a measure that represents how many more workloads the storage array can receive without a deterioration in the performance of the storage array, or more specifically, without causing performance of the storage array to drop below a specific threshold, as expressed by one or more performance parameters, such as any or some combination of the following: throughput of the storage array, latency of the storage array, saturation of the storage array, processor busy, storage device busy, and so forth. The headroom of the storage array can be computed based on any or some combination of the foregoing performance parameters. For example, if the maximum throughput of the storage array is X (which can be based on a specification of the storage array or based on prior tests of the storage array, and the current throughput of the storage array (due to current workloads executing on the storage array) is Y, then the headroom is X−Y, or possibly X−Y−B, where B represents a buffer to avoid having the storage array being run at its maximum throughput. In other examples, similar computations of headroom can be computed based on a combination of different performance parameters.

The input information supplied with a request to create a storage volume can include the following information, as examples: an application type and a size of a storage volume. For example, the application type can refer to a type of application associated with data stored in the storage volume. A database program from a specific vendor is a first application type; in other words, the database program from the specific vendor is used to read and write data in the storage volume. As other examples, the application type can refer to a type of data that is to be stored in the storage volume, for example, a first application type relates to storing a database log, a second application type relates to storing data according to a specific format, and so forth. In further examples, another application type can relate to use of virtual servers or virtual machines in storing data in a storage volume.

The size of a storage volume can refer to the amount of data that the storage volume can store. In some examples, the size of the storage volume can refer to the maximum storage capacity of the storage volume. In other examples, the size of the storage volume can refer to a target amount of data expected to be stored.

In some examples, there is a monotonic relationship between an input/output (I/O) pattern for a given application type and a size of the storage volume that a workload having the I/O pattern is run on. An I/O pattern is represented by a workload profile. The significance of the monotonic relationship between the I/O pattern for the given application type and the size of the storage volume is that as the size of the storage volume increases, the workload of the given application type running on the storage volume also increases proportionally.

In addition to the foregoing examples of input information, in further examples, additional input information can be provided. For example, the input information can further include a parameter that represents a quantity of storage volumes (of the respective application type and storage volume size) to be provisioned, where the "quantity" can be 1 or more than 1.

As another example, the input information can further indicate whether or not a type of data reduction is to be applied to data stored in the storage volume, where the data reduction can include data compression and/or data deduplication. For example, a data reduction parameter in the input information can have a first value to specify no data reduction is applied, a second value to specify data compression is applied, a third value to specify data deduplication is applied, and a fourth value to specify both data compression and data deduplication is applied.

In response to the input information, the intent-based provisioning logic 150 generates a workload profile that includes one or more characteristics of a workload to be performed with respect to the storage volume that is to be provisioned. The workload profile can include any or some combination of the following information: a rate of I/O operations, which can be expressed as IOPS, a read/write ratio, an I/O size, and so forth. As noted above, the workload profile represents an I/O pattern of the workload for the storage volume.

Based on the intent expressed by the input information, the intent-based provisioning logic 150 can recommend a selected placement of the storage volume on one or more storage arrays of the fleet of storage arrays 104.

The intent-based provisioning logic 150 can infer the workload profile from the input information based on historical workload information collected in storage arrays that perform various different workloads relating to storage volumes in the storage systems. The historical workload information can be collected for storage arrays deployed at various different sites, such as at sites of different enterprises. A monitoring system can track various characteristics of workloads executed in the storage systems, including application type, storage volume size, IOPS, read/write ratio, I/O size, and so forth. The tracked characteristics are correlated to other workload characteristics, such as IOPS, read/write ratio, I/O size, and so forth.

The workload profile is provided to a simulation engine that uses the workload profile to simulate workload(s) according to the workload profile on each storage array of the fleet of storage arrays 104. A workload according to a workload profile can refer to a workload with I/O operations performed with respect to a storage volume that have characteristics represented by at least a subset of the workload profile.

The simulation of the execution of a workload on a storage array allows the simulation engine to determine an amount of additional headroom of the storage array used by the workload. It is noted that each storage array in the fleet of storage arrays may already be executing current workloads for existing storage volumes on the storage array. Thus, any additional headroom used by the simulated workload would be on top of the headroom consumed by any existing workloads on the storage array.

As noted above, the headroom of a storage array is a measure that represents how much more workloads the storage array can receive without a deterioration in the performance of the storage array, or more specifically, without causing performance of the storage array to drop below a specific threshold. Based on the determined headroom of each storage array, the intent-based provisioning logic 150 can select one or more storage arrays onto which the storage volume is to be provisioned.

Further details regarding intent-based provisioning are provided in U.S. application Ser. No. 17/650,426, entitled "STORAGE SYSTEM SELECTION FOR STORAGE VOLUME DEPLOYMENT," filed Feb. 9, 2022, which is incorporated by reference.

Figure 4:
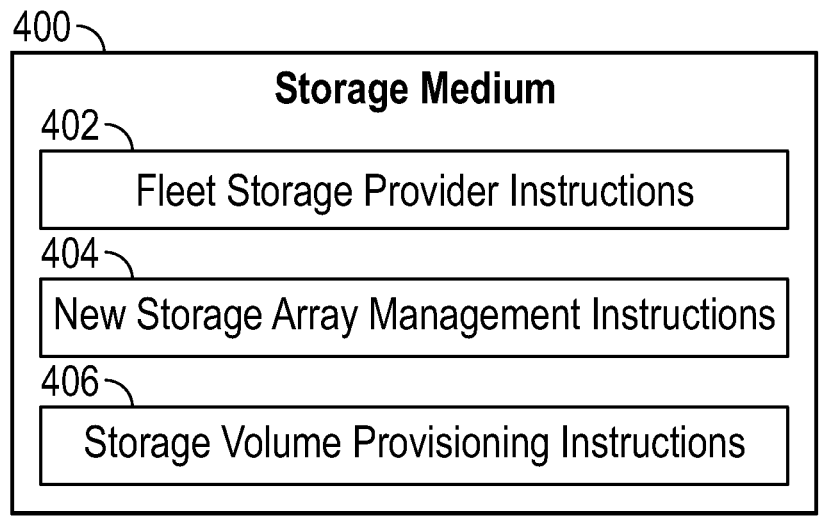
FIG. 4 is a block diagram of a storage medium storing machine-readable instructions according to some examples.

FIG. 4 is a block diagram of a non-transitory machine-readable or computer-readable storage medium 400 storing machine-readable instructions for storage array fleet management, the instructions upon execution cause a system to perform various tasks. The system can include a computer or an arrangement of multiple computers. For example, the system can include the compute cluster 102 and/or the data services management engine 106.

The machine-readable instructions include fleet storage provider instructions 402 (such as instructions of the fleet storage provider 118 of FIG. 1) that perform storage management operations for a fleet of storage arrays. The storage arrays in the fleet of storage arrays are of one or more storage types, where each storage type of the one or more storage types maps to a respective storage class of a plurality of different storage classes. In some examples, the storage management operations for the fleet of storage arrays performed by the fleet storage provider include managing storage volumes (e.g., creating storage volumes, updating storage volumes, deleting storage volumes, etc.) containing data stored at the fleet of storage arrays. In further examples, the storage management operations for the fleet of storage arrays performed by the fleet storage provider include cloning storage volumes, taking snapshots of data of storage volumes, and deleting snapshots of data.

The machine-readable instructions include new storage array management instructions 404 to, in response to an addition, to the fleet of storage arrays, of a new storage array of a first storage type different from each storage type of the one or more storage types, identify the new storage array as being associated with a first storage class of the plurality of different storage classes, and associate the new storage array with a fleet service (e.g., the fleet service 120 of FIG. 1) that abstracts component details of the fleet of storage arrays to the fleet storage provider. In some examples, the system supports use of the new storage array without creating an individual storage provider for the new storage array.

The machine-readable instructions include storage volume provisioning instructions 406 to provision, in response to a request, a storage volume on a selected storage array of the fleet of storage arrays, where the provisioning is performed by the fleet storage provider in cooperation with the fleet service.

In some examples, the machine-readable instructions create fleet connection information (e.g., 122 in FIG. 1) that is useable by the fleet storage provider to access the fleet service.

In some examples, the machine-readable instructions receive a request to create the storage volume, the request indicating that the storage volume is to be associated with a storage array of a selected storage class of the plurality of different storage classes. The provisioning of the storage volume is responsive to the request.

In some examples, the machine-readable instructions select the selected storage array on which the storage volume is to be provisioned based on receiving input information of characteristics relating to the storage volume, determining, based on the input information of the characteristics relating to the storage volume, a workload profile, and selecting, based on the workload profile, the selected storage array from the fleet of storage arrays.

Figure 5:
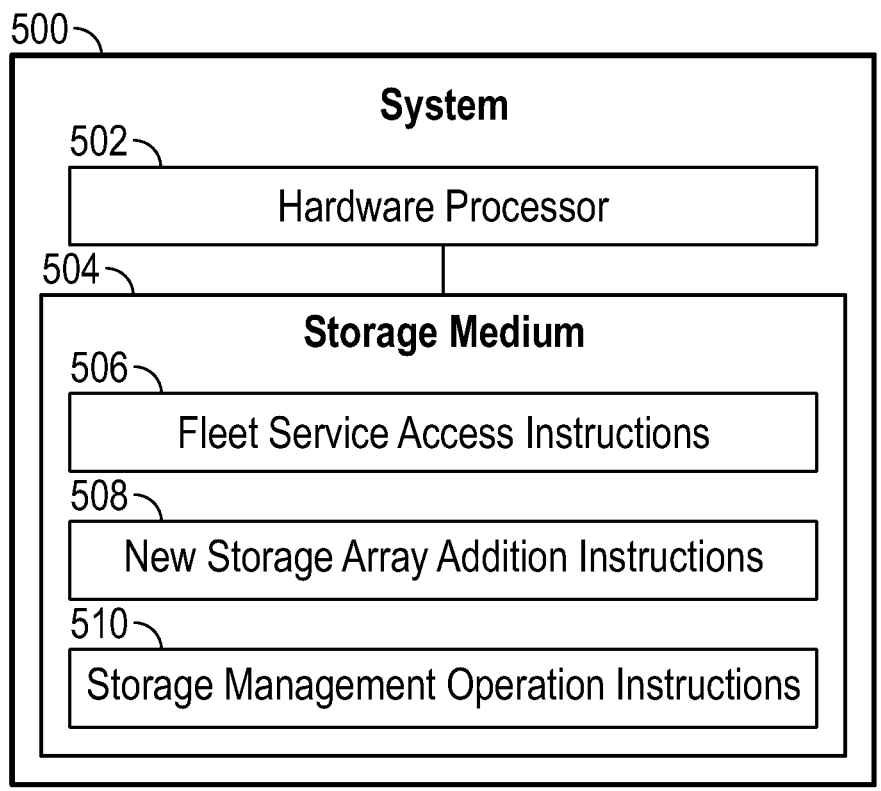
FIG. 5 is a block diagram of a system according to some examples.

FIG. 5 is a block diagram of a system 500 according to some examples of the present disclosure. The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include fleet service access instructions 506 to use fleet connection information to access a fleet service that abstracts component details of a fleet of storage arrays. The fleet of storage arrays includes storage arrays of different storage types. The fleet connection information can include location information of the fleet service and credential information, in some examples. In some examples, the fleet service is configured with component details of the storage arrays of the fleet of storage arrays, the component details including network addresses of the storage arrays of the fleet of storage arrays.

The machine-readable instructions in the storage medium 504 include new storage array addition instructions 508 to in response to an addition, to the fleet of storage arrays, of a new storage array of a storage type different from each storage type of the different storage types, associate the new storage array with the fleet service. In some examples, associating the new storage array with the fleet service can include configuring the fleet service with information (e.g., network address of new storage array, etc.) to allow the fleet service to interact with the new storage array.

The machine-readable instructions in the storage medium 504 include storage management operation instructions 510 to perform, based on interacting with the fleet service using the fleet connection information, a storage management operation with respect to the new storage array.

Figure 6:
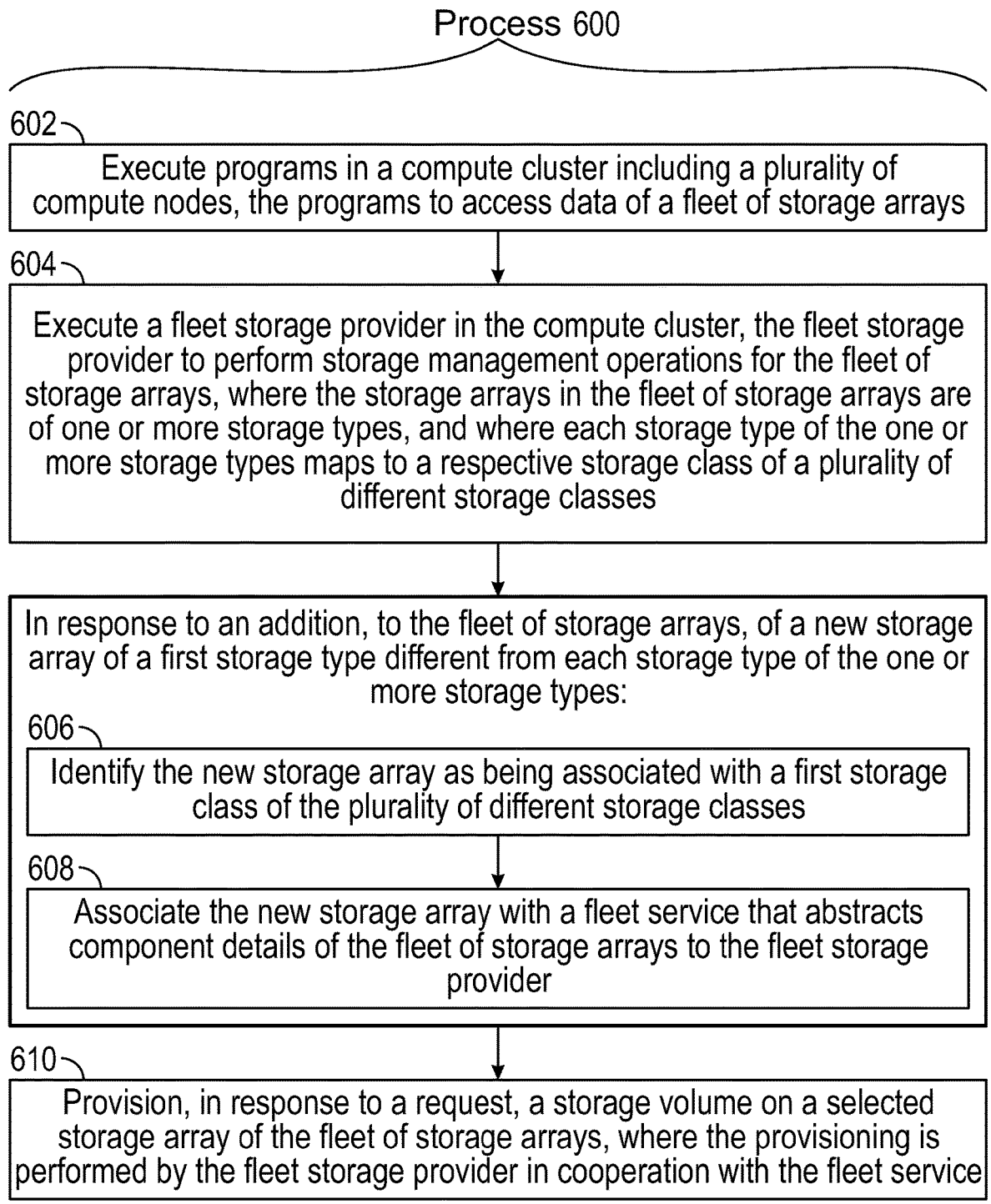
FIG. 6 is a flow diagram of a process according to some examples.

FIG. 6 is a flow diagram of a process 600 according to some examples. The process 600 includes executing (at 602) programs in a compute cluster including a plurality of compute nodes, the programs to access data of a fleet of storage arrays. The compute cluster can be a Kubernetes cluster, for example, and the programs can be executed in pods containing containers of the Kubernetes cluster.

The process 600 includes executing (at 604) a fleet storage provider in the compute cluster, the fleet storage provider to perform storage management operations for the fleet of storage arrays. The storage arrays in the fleet of storage arrays are of one or more storage types, where each storage type of the one or more storage types maps to a respective storage class of a plurality of different storage classes.

The process 600 includes performing tasks 606 and 608 in response to an addition, to the fleet of storage arrays, of a new storage array of a first storage type different from each storage type of the one or more storage types. Task 606 includes identifying the new storage array as being associated with a first storage class of the plurality of different storage classes, and task 608 includes associating the new storage array with a fleet service that abstracts component details of the fleet of storage arrays to the fleet storage provider.

The process 600 includes provisioning (at 610), in response to a request, a storage volume on a selected storage array of the fleet of storage arrays. The provisioning performed by the fleet storage provider in cooperation with the fleet service.

A storage medium (e.g., 400 in FIG. 4 or 504 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions for storage array fleet management, the instructions upon execution cause a system to:
provide a fleet storage provider that performs storage management operations for a fleet of storage arrays, the storage arrays in the fleet of storage arrays being of one or more storage types, wherein each storage type of the one or more storage types maps to a respective storage class of a plurality of different storage classes;
in response to an addition, to the fleet of storage arrays, of a new storage array of a first storage type different from each storage type of the one or more storage types:
identify the new storage array as being associated with a first storage class of the plurality of different storage classes, and
associate the new storage array with a fleet service that abstracts component details of the fleet of storage arrays to the fleet storage provider; and
receive a request to create a storage volume, the request indicating that the storage volume is to be associated with a storage array of a selected storage class of the plurality of different storage classes;
select, from the fleet of storage arrays, a first storage array on which the storage volume is to be provisioned based on:
receiving input information of characteristics relating to the storage volume,
determining, based on the input information of the characteristics relating to the storage volume, a workload profile, and
selecting, based on the workload profile, the first storage array from the fleet of storage arrays; and
provision, in response to the request, the storage volume on the selected first storage array of the fleet of storage arrays, the provisioning performed by the fleet storage provider in cooperation with the fleet service.

2. The non-transitory machine-readable storage medium of claim 1, wherein the instructions upon execution cause the system to support use of the new storage array without creating an individual storage provider for the new storage array.

3. The non-transitory machine-readable storage medium of claim 1, wherein the storage management operations for the fleet of storage arrays performed by the fleet storage provider comprise managing storage volumes containing data stored at the fleet of storage arrays.

4. The non-transitory machine-readable storage medium of claim 1, wherein the storage management operations for the fleet of storage arrays performed by the fleet storage provider comprise cloning storage volumes, taking snapshots of data of storage volumes, and deleting snapshots of data.

5. The non-transitory machine-readable storage medium of claim 1, wherein the instructions upon execution cause the system to associate the new storage array with the fleet service in response to onboarding of the new storage array with the system.

6. The non-transitory machine-readable storage medium of claim 1, wherein the instructions upon execution cause the system to create fleet connection information useable by the fleet storage provider to access the fleet service.

7. The non-transitory machine-readable storage medium of claim 6, wherein the fleet connection information comprises location information of the fleet service.

8. The non-transitory machine-readable storage medium of claim 6, wherein the fleet connection information comprises credential information useable by the fleet storage provider to authorize a request for a storage management operation with respect to the fleet of storage arrays.

9. The non-transitory machine-readable storage medium of claim 5, wherein the associating of the new storage array with the fleet service comprises configuring the fleet service with a network address of the new storage array.

10. The non-transitory machine-readable storage medium of claim 1, wherein the instructions upon execution cause the system to:
scale, by the fleet service, the fleet of storage arrays with additional storage arrays based on addition of compute nodes to a compute cluster of compute nodes that includes programs to access the fleet of storage arrays.

11. The non-transitory machine-readable storage medium of claim 1, wherein the instructions upon execution cause the system to:
automatically enumerate the plurality of different storage classes based on storage types of storage arrays present in the fleet of storage arrays.

12. The non-transitory machine-readable storage medium of claim 11, wherein the instructions upon execution cause the system to:
present, in a user interface, a list of the plurality of different storage classes from which the selected storage class is picked.

13. The non-transitory machine-readable storage medium of claim 1, wherein the selecting of the first storage array is further based on simulating an execution of a workload having the workload profile in respective storage arrays of the fleet of storage arrays.

14. A system comprising:
a hardware processor; and
a non-transitory storage medium storing fleet storage provider instructions executable on the hardware processor to:
execute a fleet storage provider that performs storage management operations for a fleet of storage arrays, the storage arrays in the fleet of storage arrays being of one or more storage types, wherein each storage type of the one or more storage types maps to a respective storage class of a plurality of different storage classes;
in response to an addition, to the fleet of storage arrays, of a new storage array of a first storage type different from each storage type of the one or more storage types:

identify the new storage array as being associated with a first storage class of the plurality of different storage classes, and associate the new storage array with a fleet service that abstracts component details of the fleet of storage arrays to the fleet storage provider; and receive a request to create a storage volume, the request indicating that the storage volume is to be associated with a storage array of a selected storage class of the plurality of different storage classes;

provision, in response to the request, the storage volume on a selected storage array of the fleet of storage arrays, the provisioning performed by the fleet storage provider in cooperation with the fleet service; and automatically enumerate the plurality of different storage classes based on storage types of storage arrays present in the fleet of storage arrays.

15. The system of claim 14, wherein the instructions are executable on the hardware processor to:

add the first storage class based on the addition of the new storage array.

16. The system of claim 14, wherein the instructions are executable on the hardware processor to:

select, from the fleet of storage arrays, the selected storage array on which the storage volume is to be provisioned based on:
  receiving input information of characteristics relating to the storage volume,
  determining, based on the input information of the characteristics relating to the storage volume, a workload profile, and
  selecting, based on the workload profile, the selected storage array from the fleet of storage arrays.

17. The system of claim 14, wherein the fleet service is configured with component details of the storage arrays of the fleet of storage arrays, the component details comprising network addresses and security certificates of the storage arrays of the fleet of storage arrays.

18. The system of claim 14, wherein the fleet service that abstracts the component details of the fleet of storage arrays so that the fleet storage provider instructions do not have to be provided with individual connection information relating to the storage arrays of the fleet of storage arrays, the individual connection information comprising network addresses of the storage arrays of the fleet of storage arrays.

19. A method of a system comprising a hardware processor, the method comprising:

executing programs in a compute cluster comprising a plurality of compute nodes, the programs to access data of a fleet of storage arrays;

executing a fleet storage provider in the compute cluster, the fleet storage provider to perform storage management operations for the fleet of storage arrays, the storage arrays in the fleet of storage arrays being of one or more storage types, wherein each storage type of the one or more storage types maps to a respective storage class of a plurality of different storage classes;

in response to an addition, to the fleet of storage arrays, of a new storage array of a first storage type different from each storage type of the one or more storage types:
  identifying the new storage array as being associated with a first storage class of the plurality of different storage classes, and
  associating the new storage array with a fleet service that abstracts component details of the fleet of storage arrays to the fleet storage provider;

receiving a request to create a storage volume;

selecting, from the fleet of storage arrays, a first storage array on which the storage volume is to be provisioned based on:
  receiving input information of characteristics relating to the storage volume,
  determining, based on the input information of the characteristics relating to the storage volume, a workload profile, and
  selecting, based on the workload profile, the first storage array from the fleet of storage arrays;

provisioning, in response to the request, the storage volume on the selected first storage array of the fleet of storage arrays, the provisioning performed by the fleet storage provider in cooperation with the fleet service.

20. The method of claim 19, wherein the selecting of the first storage array is further based on simulating an execution of a workload having the workload profile in respective storage arrays of the fleet of storage arrays.

* * * * *